(12) United States Patent
Widjaja

(10) Patent No.: US 12,123,734 B2
(45) Date of Patent: Oct. 22, 2024

(54) AUTOMATIC ANNOTATION OF DRIVABLE ROAD SEGMENTS

(71) Applicant: Motional AD LLC, Boston, MA (US)

(72) Inventor: Sergi Adipraja Widjaja, Singapore (SG)

(73) Assignee: Motional AD LLC, Boston, MA (US)

( * ) Notice: Subject to any disclaimer, the term of this patent is extended or adjusted under 35 U.S.C. 154(b) by 341 days.

(21) Appl. No.: 17/539,413

(22) Filed: Dec. 1, 2021

(65) Prior Publication Data

US 2023/0168100 A1   Jun. 1, 2023

(51) Int. Cl.
| | |
|---|---|
| *G01C 21/36* | (2006.01) |
| *G01C 21/00* | (2006.01) |
| *G05D 1/00* | (2024.01) |
| *G06T 5/20* | (2006.01) |
| *G06T 5/70* | (2024.01) |
| *G06T 7/11* | (2017.01) |

(52) U.S. Cl.
CPC ..... *G01C 21/3626* (2013.01); *G01C 21/3804* (2020.08); *G06T 5/20* (2013.01); *G06T 5/70* (2024.01); *G06T 7/11* (2017.01); *G05D 1/0274* (2013.01); *G06T 2207/20021* (2013.01); *G06T 2207/20084* (2013.01)

(58) Field of Classification Search
CPC ............ G01C 21/3626; G01C 21/3804; G01C 21/3815; G06T 5/20; G06T 5/70; G06T 7/11; G06T 2207/20021; G06T 2207/20084; G05D 1/0274; G06N 3/084
See application file for complete search history.

(56) References Cited

U.S. PATENT DOCUMENTS

| | | | |
|---|---|---|---|
| 2019/0266418 A1* | 8/2019 | Xu ....................... | G06V 10/457 |
| 2019/0384304 A1* | 12/2019 | Towal .................. | G05D 1/0221 |
| 2020/0025935 A1* | 1/2020 | Liang ................... | G06V 20/64 |
| 2020/0104613 A1* | 4/2020 | Hirai ................... | G06V 20/586 |
| 2020/0160068 A1 | 5/2020 | Silver et al. | |
| 2020/0250439 A1* | 8/2020 | Vig ...................... | G05D 1/0246 |
| 2020/0309535 A1 | 10/2020 | Shi et al. | |
| 2021/0026355 A1* | 1/2021 | Chen ................... | G06F 18/22 |
| 2021/0201569 A1* | 7/2021 | Marschner ............ | G01S 17/89 |
| 2022/0026920 A1* | 1/2022 | Ebrahimi Afrouzi ....................... B25J 9/1664 |

(Continued)

FOREIGN PATENT DOCUMENTS

JP    2020-166268    10/2020

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Aniss Chad
*Assistant Examiner* — Jennifer M Anda
(74) *Attorney, Agent, or Firm* — Fish & Richardson P.C.

(57) ABSTRACT

Provided are techniques for automatic annotation of drivable road segments, including but not limited to: receiving sensor data, generating a map, dividing the map into disjoint sub-maps, inferring sub-map segmentation masks, constructing an inferred segmentation mask, filtering the inferred segmentation mask, smoothing the filtered segmentation mask, planning a path for a vehicle and controller the vehicle.

17 Claims, 9 Drawing Sheets

(56) References Cited

U.S. PATENT DOCUMENTS

2024/0005167 A1* 1/2024 Yang .................. G06N 3/045

OTHER PUBLICATIONS

Beluch et al., "The power of ensembles for active learning in image classification," In Proceedings of the IEEE Conference on Computer Vision and Pattern Recognition, 2018, pp. 9368-9377.

Jegou et al., "The One Hundred Layers Tiramisu: Fully Convolutional DenseNets for Semantic Segmentation," In Proceedings of the IEEE Conference on Computer Vision and Pattern Recognition Workshops, 2017, pp. 11-19.

OpenCV.org [online], "Contours Hierarchy," available on or before 2017, retrieved on Sep. 1, 2022, retrieved from URL <https://docs.opencv.org/4.x/d9/d8b/tutorial_py_contours_hierarchy.html>, 4 pages.

\* cited by examiner

FIG. 4

AUTOMATIC ANNOTATION OF DRIVABLE ROAD SEGMENTS

FIELD OF THE INVENTION

This description relates to annotation of drivable road segments included in two-dimensional and/or three-dimensional maps.

BACKGROUND

Autonomous vehicles can use pre-generated maps when navigating from a current location to a destination. These pre-generated maps are often annotated based on user input to identify drivable road segments. This is a time-consuming process and requires significant resources both in time needed to generate such maps as well as computing and financial resources.

BRIEF DESCRIPTION OF THE DRAWINGS

FIG. 4 shows an example architecture for an AV.

DETAILED DESCRIPTION

Figure 1:
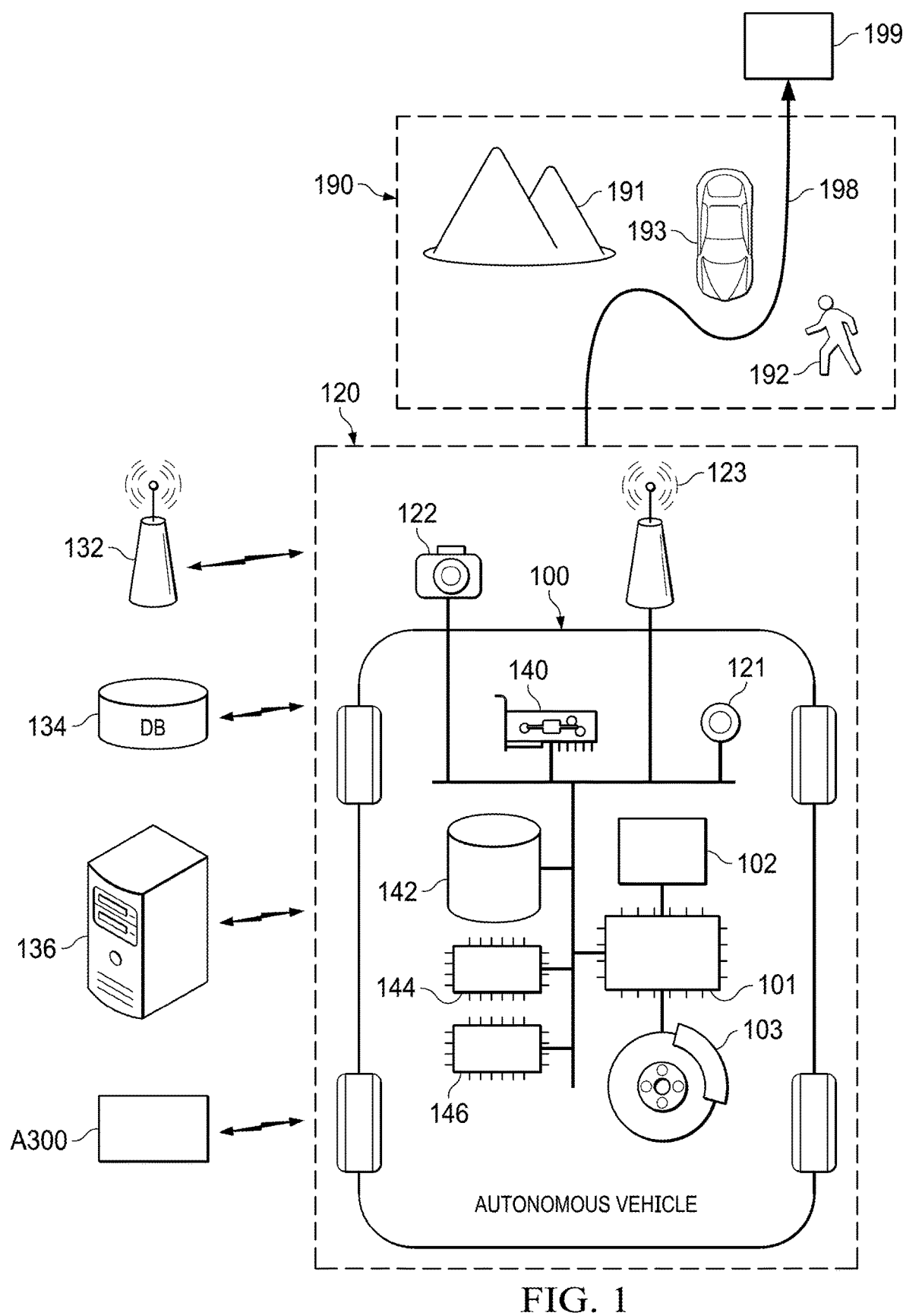
FIG. 1 shows an example of an autonomous vehicle (AV) having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Automatic Annotation of Drivable Road Segments General Overview The present techniques enable automatic annotation of drivable road segments. In examples, the drivable road segments are identified in birds-eye-view data, such as merged maps. A multi-stage annotation system that receives sensor data indicative of an environment surrounding a vehicle, generates a map representative of the surrounding environment based on the sensor data. A map layer is divided into sub-maps and a sub-map segmentation mask indicative of a drivable road segment on the sub-map is inferred for each sub-map. An inferred segmentation mask indicative of all drivable road segments on the map based is constructed based on the sub-map segmentation masks. The inferred segmentation mask is filtered to generate a filtered segmentation mask based on a threshold and the filtered segmentation mask is smoothed to generate a smoothed segmentation mask with at least one continuous drivable road segment, based on at least one criterion.

Some of the advantages of the disclosed system include the following. The system annotates drivable road segments more efficiently than hand-annotation and reduces the computational resources and time required. The resulting annotation is also more accurate while the output drivable road segment is continuous. For example, sensor data associated with the environment is ultimately rendered in a map as a drivable road segment, improving maps and other data representations with drivable road segments. The present techniques further improve the efficiency of an autonomous vehicle operable according to the maps and other data representations with drivable road segments as described herein.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 13 million automobile accidents, 2.4 million injuries, 40,000 fatalities, and 6 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, include instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) and Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of their personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
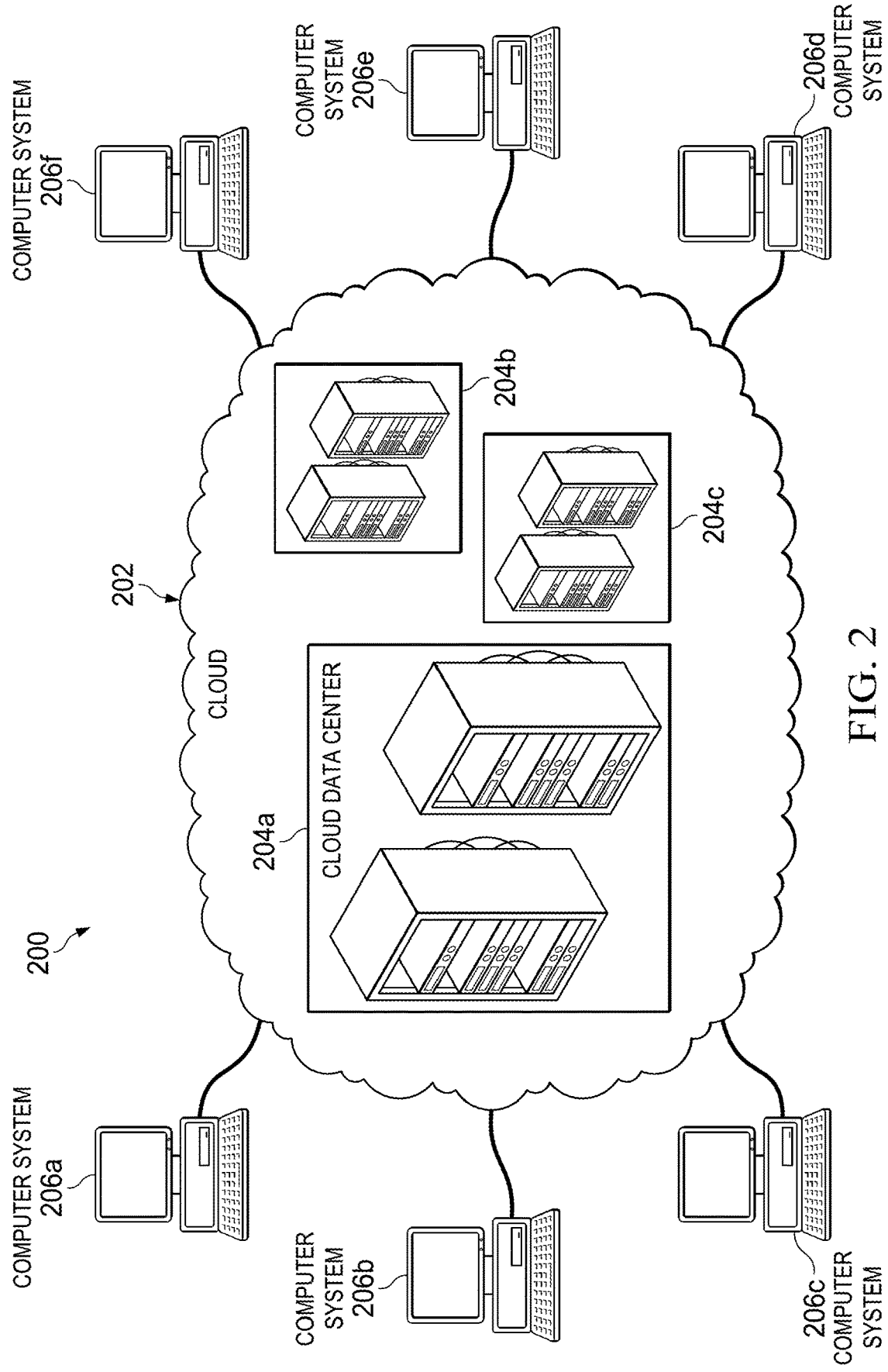
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206*a-f* are implemented in or as a part of other systems.

Figure 3:
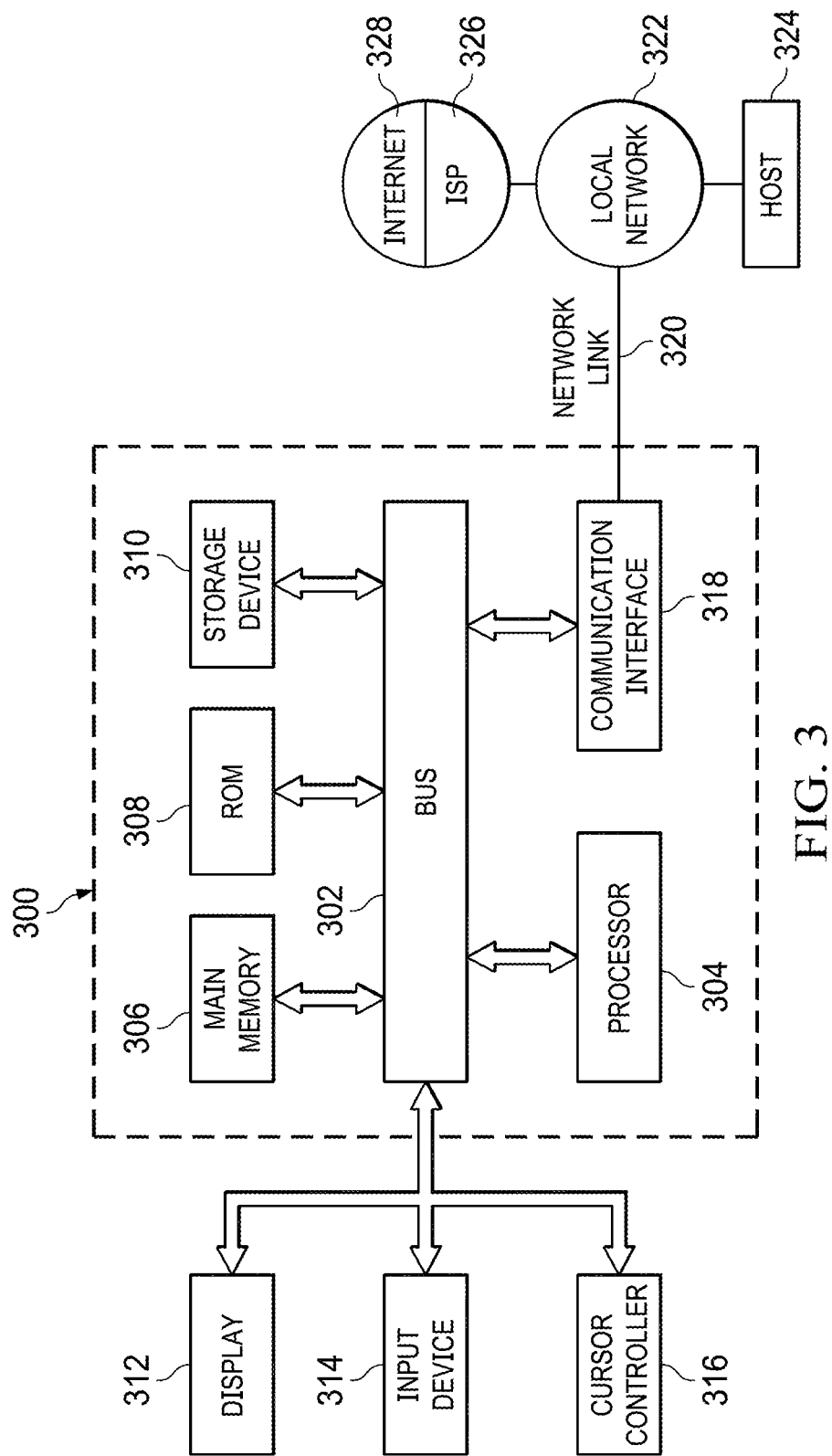
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that stores data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
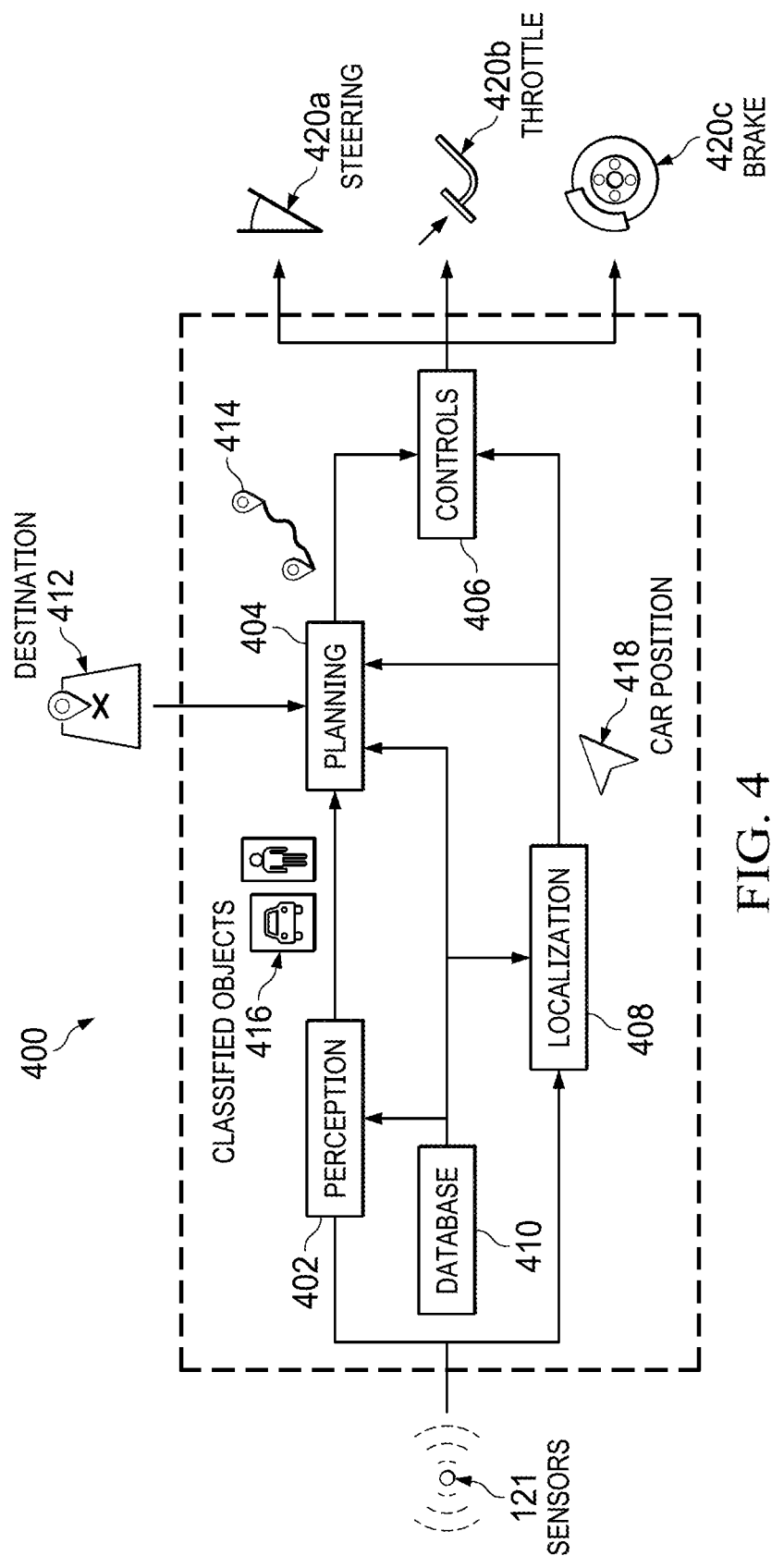

FIG. 4 shows an example architecture 400 for an AV (e.g., the vehicle 100 shown in FIG. 1). The architecture 400 includes a perception system 402 (sometimes referred to as a perception circuit), a planning system 404 (sometimes referred to as a planning circuit), a control system 406 (sometimes referred to as a control circuit), a localization system 408 (sometimes referred to as a localization circuit), and a database system 410 (sometimes referred to as a database circuit). Each system plays a role in the operation of the vehicle 100. Together, the systems 402, 404, 406, 408, and 410 can be part of the AV system 120 shown in FIG. 1. In some embodiments, any of the systems 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things. Each of the systems 402, 404, 406, 408, and 410 is sometimes referred to as a processing circuit (e.g., computer hardware, computer software, or a combination of the two). A combination of any or all of the systems 402, 404, 406, 408, and 410 is also an example of a processing circuit.

In use, the planning system 404 receives data representing a destination 412 and determines data representing a trajectory 414 (sometimes referred to as a route) that can be traveled by the vehicle 100 to reach (e.g., arrive at) the destination 412. In order for the planning system 404 to determine the data representing the trajectory 414, the planning system 404 receives data from the perception system 402, the localization system 408, and the database system 410.

The perception system 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning system 404.

The planning system 404 also receives data representing the AV position 418 from the localization system 408. The localization system 408 determines the AV position by using data from the sensors 121 and data from the database system 410 (e.g., a geographic data) to calculate a position. For example, the localization system 408 uses data from a GNSS (Global Navigation Satellite System) sensor and geographic data to calculate a longitude and latitude of the AV. In an embodiment, data used by the localization system 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control system 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 5:
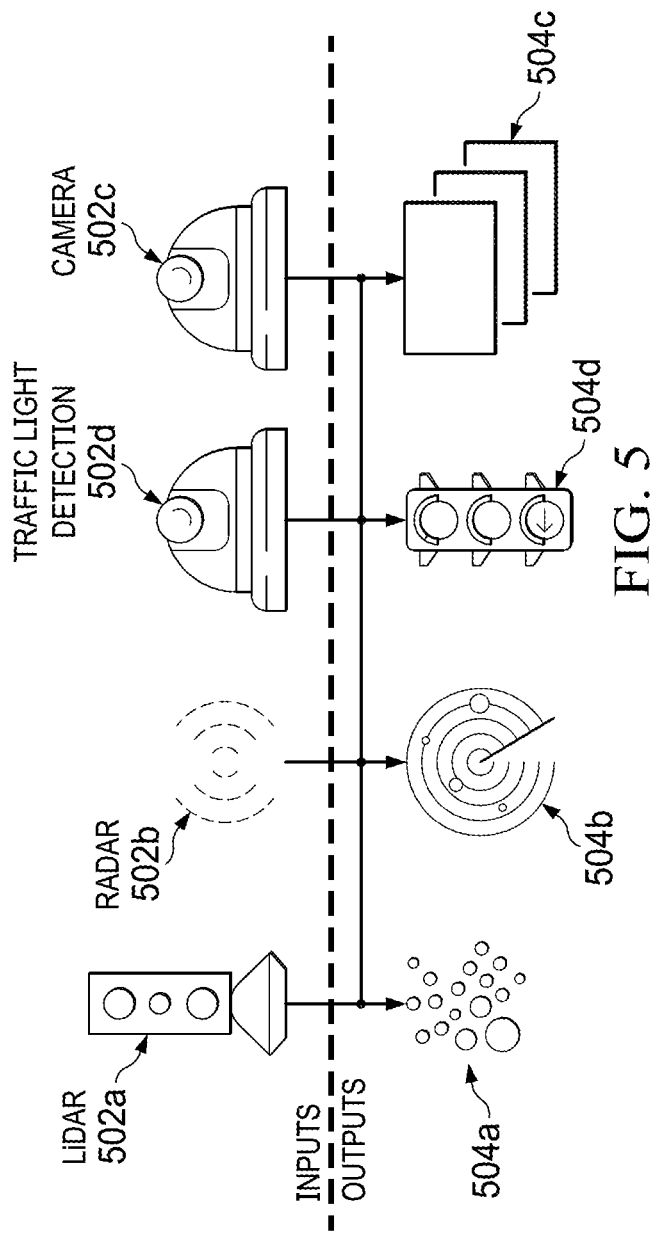
FIG. 5 shows an example of inputs and outputs that can be used by a perception system.

FIG. 5 shows an example of inputs 502a-d (e.g., sensors 121 shown in FIG. 1) and outputs 504a-d (e.g., sensor data) that is used by the perception system 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504*a-d* are combined using a sensor fusion technique. Thus, either the individual outputs 504*a-d* are provided to other systems of the vehicle 100 (e.g., provided to a planning system 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Automatic Annotation of Drivable Road Segments

Figure 6:
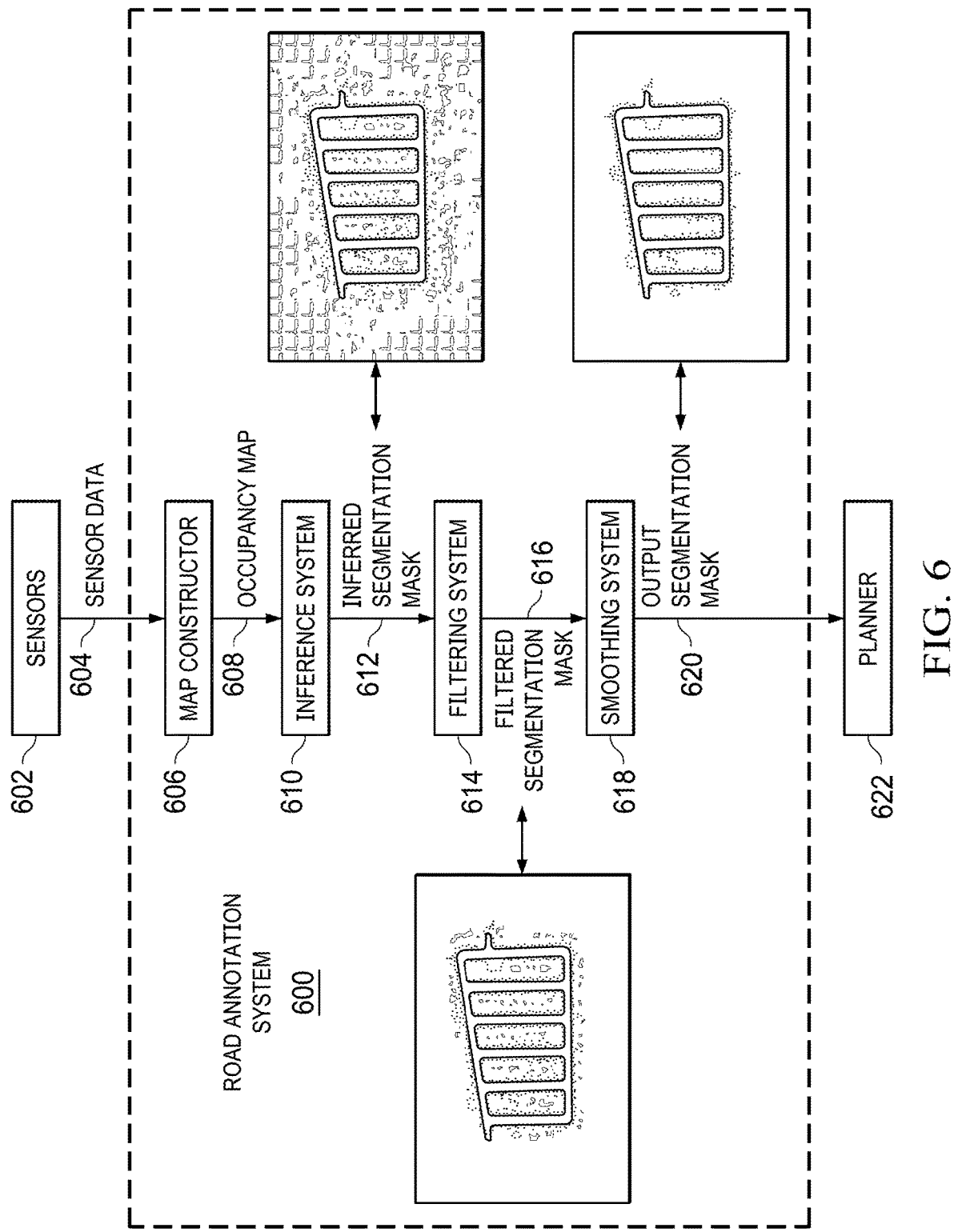
FIG. 6 shows a block diagram of an example road annotation system.

FIG. 6 shows a block diagram of an example road annotation system 600. In an embodiment, the road annotation system 600 is a part of the processing circuit shown in FIG. 4. In an embodiment, the road annotation system 600 is a part of the cloud 202 shown in FIG. 2. Generally, the road annotation system 600 annotates map data by labeling portions of the map data as corresponding to a drivable area of the environment. A drivable area is a portion of the environment (e.g., a physical area) that can be traversed by a vehicle. For example, a drivable area is a road that corresponds to a named thoroughfare (e.g., city street, interstate freeway, etc.). In examples, the drivable area is a road that corresponds to an unnamed thoroughfare (e.g., a driveway in a house or office building, a section of a parking lot, a section of a vacant lot, a dirt path in a rural area, etc. For ease of description, the drivable area is referred to as a drivable road. However, the present techniques are not limited to a particular road type and any road can be labeled according to the present techniques. In an example, a label identifies an area as being a part of a drivable road segment or not being a part of a drivable road segment. In an embodiment, the road annotation system 600 is a standalone system on an AV, such as the AV 100 shown in FIG. 1. In an embodiment, the road annotation system 600 is part of the processor 304 shown in FIG. 3. In an embodiment, the road annotation system 600 is part of a remote processor in a cloud 202 shown in FIG. 2.

The road annotation system 600 takes as input sensor data 604 output by sensors 602 of an AV. In an embodiment, the sensors 602 includes at least one LiDAR 502*a*, RADAR 502*b* or camera 502*c* as shown in FIG. 5. Correspondingly, in an embodiment, the sensor data 604 includes at least one of LiDAR data 504*a* in the form of point clouds, RADAR data 504*b* in the form of one or more radio frequency electromagnetic signals, or camera data 504*c* in the form of image data. In an embodiment, other sensors and the corresponding data from the sensors are used. For example, an ultrasonic device capable of emitting and receiving high frequency sound signals is used. The ultrasonic device generates sound data, which is used as inputs to the road annotation system 600.

The sensor data 604 is used by a map constructor 606 to generate a map representative of the surroundings of an AV (e.g., AV 100 of FIG. 1). Generally, the map constructor 606 generates at least one semantic map layer. In embodiments, each layer includes information that characterizes the corresponding physical area. For example, a semantic map layers include information that characterizes drivable areas, pedestrian areas, car park areas, bicycle lanes, high occupancy vehicle area, and the like. With traditional data, areas are manually annotated to indicate to characterize the physical area. In embodiments, the present techniques enable automated annotation of semantic map layers. The automated annotation of semantic map layers as described herein increases the amount of accurately labeled maps available. For ease of description, the present techniques are described as an automated annotation of a map with drivable areas. However, the present techniques can annotate a map with other data and the drivable areas are used for exemplary purposes.

In an embodiment, the map is an occupancy map 608. An occupancy map (also known as an occupancy grid) is a representation of the environment based on the presence of objects in the environment. In an embodiment, the occupancy map 608 is a two-dimensional (2D) map, where each cell of the occupancy map 608 represents a discretized space (e.g., evenly divided 2D blocks) in the surroundings of the AV. Discretizing spaces into cells is often based on a pre-defined occupancy map size (e.g., pre-defined width and length). The value assigned to each cell of the occupancy map 608 represents likelihood that the space corresponding to the cell is obstructed or occupied by objects (e.g., pedestrians, vehicles, and/or the like). In an embodiment, a higher value for a given cell in the occupancy map 608 indicates a lower probability of a free space, or a space neither occupied by objects nor obstructed from the view of the sensors 602 on the AV. When used as an image, the occupancy map 608 has free spaces shown as brighter regions (e.g., regions with higher pixel values), while occupied spaces shown as darker regions (e.g., regions with low pixel values). For example, a pixel in the occupancy map 608 is assigned 0 if the space corresponding to the pixel is not observable from the AV, e.g. when the space is behind a building which blocks the view of the sensors 602 on the AV. In such an example, the occupancy map 608 is an 8-bit grey-scale image with pixel values ranging from 0 to 255, where a pixel value of 0 represents black or a darkest intensity pixel.

The occupancy map 608 is taken as input by an inference system 610 which generates an inferred segmentation mask 612 indicating the locations of drivable road segments. In examples, the inferred segmentation mask 612 is one or more road segments that are determined to be drivable. The inferred segmentation mask is generated by a machine learning algorithm as described with respect to FIG. 7. Generally, the inference system 610 includes a machine learning algorithm, such as an artificial neural network (e.g., a convolutional neural network such as a U-Net). In some examples, road annotation system 600 uses a machine learning algorithm to determine that a given pixel from an input occupancy map 608 corresponds to a drivable road segment, and generates an inferred segmentation mask 612 that is a set of pixels classified as drivable areas. Generally, to make the predictions, the inference system 610 operates on small patches of the occupancy map 608 called sub-maps. Further details regarding the inference system 610 and the operations performed on the sub-maps are found below in reference to FIG. 7. Other maps can also be used including but not limited to intensity maps, texture (normals) maps, and maps output by one or more other machine learning models, such as an image segmentation network or a point cloud segmentation network.

The inferred segmentation mask 612 contains an identification of one or more drivable areas as output by the inference system 610 based on the occupancy map 608. In an embodiment, the inferred segmentation mask 612 is a map with the same size (e.g., the same dimensions) as the occupancy map 608. In an embodiment, the inferred segmentation mask 612 is a 2D binary map containing two labels (e.g., 0 and 1, where 0 indicates a non-drivable road segment and 1 indicates a drivable road segment). For example, the inferred segmentation mask 612 is a 2D binary map in the form of an image, where a pixel of the inferred segmentation mask 612 is assigned 1 if the corresponding pixel of the occupancy map 608 is predicted by the inference system 610 as a drivable road segment, and 0 if the corresponding pixel of the occupancy map 608 is predicted by the inference system 610 as not part of a drivable road segment. In another embodiment, another Boolean value is used to differentiate between a drivable road segment and not a drivable road segment in the inferred segmentation mask 612. For simplicity, the following discussion assigns a value of 1 to drivable road segments and a label of 0 to un-drivable (e.g., not drivable) road segments.

In an embodiment, the inferred segmentation mask 612 is provided as input to a filtering system 614. The filtering system 614 filters the inferred segmentation mask 612 to generate a filtered segmentation mask 616 based on a threshold. Generally, the filtering system 614 relabels some pixels of the inferred segmentation mask 612. In an embodiment, the filtering system 614 relabels false positives (e.g., pixels that ought to be labeled as 0 but labeled as 1) of the inferred segmentation mask 612 to generate the filtered segmentation mask 616. The relabeling increases the accuracy of labels in the filtered segmentation mask 616. Further details regarding the false positives is found below in reference to FIG. 7.

The filtering system 614 relabels false positives based on a threshold. In an embodiment, the threshold is a value associated with a likelihood of occupancy in the corresponding occupancy map 608. For example, in an embodiment, the threshold is a pre-defined numerical value, such as 0.1. In this example, if the value assigned to a cell of the occupancy map is greater/less than the value, then the label associated with the pixel/cell is relabeled. In examples, relabeling refers to changing the current label to a different label. In an embodiment, the threshold is a dynamically determined value, such as the 25th quartile of the likelihood values in the corresponding occupancy map 608.

If the inferred segmentation mask 612 includes drivable road segments that are located in regions associated with a low likelihood of free space (e.g., regions beyond the range of sensors on a vehicle) in a corresponding occupancy map 608, the labeled drivable road segments are likely to be mislabeled or of little interest to the AV. Labeled drivable road segments having likelihood values in the corresponding occupancy map 608 that are lower than a threshold are considered false positives and are relabeled as not a drivable road segment. For example, if a pixel of an inferred segmentation mask 612 is labeled 1 (e.g. part of a drivable road segment), but the corresponding pixel in the occupancy map 608 has a pixel value not meeting the threshold, the pixel labeled as 1 is in an area not sufficiently explored by the vehicle and is considered to be a false positive. The filtering system 614 relabels the pixel as 0 (e.g. not part of a drivable road segment). In another example, an inferred segmentation mask 612 has pixels corresponding to areas far from and not seen by the vehicle (e.g. areas with 0-valued pixels in the corresponding occupancy map 608) labeled as 1 (e.g., part of a drivable road segment). After filtering, the resulting filtered segmentation mask 616 relabels those pixels as 0. In examples, the relabeled segmentation mask is the filtered segmentation mask 616. The filtered segmentation mask 616 is more accurate than the inferred segmentation mask 612 as false positives are corrected and relabeled.

In an embodiment, the filtered segmentation mask 616 is provided as input to a smoothing system 618. The smoothing system 618 smooths the filtered segmentation mask 616 to generate an output segmentation mask 620 which contains at least one continuous drivable road segment based on some criterion or a set of criteria. In an embodiment, the criterion is the maximum area enclosed by the contours of all recognized drivable road segment, as it is assumed that the AV travels on a connected road segment. Road segments not connected to the road segment on which the AV is traveling (e.g., a road segment across a river, a road segment behind a restricted area and/or the like) are of little interest to the AV and are disregarded.

For example, the filtered segmentation mask 616 can contain artifact positive labels (e.g. pixels labeled 1 in areas not navigable by a vehicle, such as a park, a plaza and/or the like). Generally, an artifact is a map location labeled as a drivable area, where the drivable area does not exist in the environment. In an embodiment, the smoothing system 618 determines contours of one or more pixels labeled 1 (i.e., all labeled road segments) on the filtered segmentation mask 616. In an embodiment, the smoothing system 618 removes segments based on at least one criterion. In this example, the drivable area is limited based on a maximum area enclosed by the contours of all recognized drivable road segment since the AV travels on a connected road segment. Additionally, if the segment satisfies a location criteria, such as not being connected to the road segment on which the AV is traveling, being located across a river or occlusion, or being a road segment behind a restricted area, the segment is removed from the segmentation mask. In an embodiment, the segment is relabeled as not being a drivable road segment. In embodiments, contour determination is performed using edge detection.

The smoothing system 618 removes noise or artifact positive labels by comparing recognized drivable road segments against the criterion. In an embodiment, the smoothing system 618 keeps only the continuous segment with the largest area as a drivable road segment, and relabels all other segments as not drivable road segments (e.g., relabeling all pixels in the smaller segments as 0). After smoothing, the smoothing system 618 generates a continuous output segmentation mask 620. The resulting output segmentation mask 620 contains labels of at least one continuous drivable road.

In an embodiment, the output segmentation mask 620 is provided as input to a planner 622, which plans paths or actions for the vehicle. In an embodiment, the planner 622 is part of the planning circuit 404.

Figure 7:
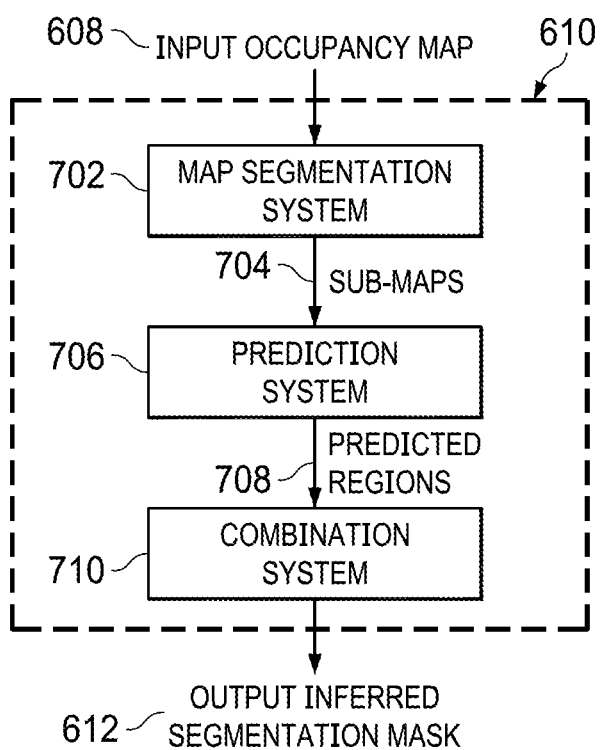
FIG. 7 shows a block diagram of the inputs, outputs, and components of an example inference system used in the road annotation system shown in FIG. 6.

FIG. 7 is a block diagram of an example inference system 610 used in the road annotation system 600 shown in FIG. 6. The input to the example inference system 610 is an input occupancy map 608. The input occupancy map 608 is provided to a map segmentation system 702. In embodiments, the map segmentation system 702 divides the input occupancy map 608 into one or more sub-maps 704 of the occupancy map 608. In examples, the physical area represented by a sub-map corresponds to at least a portion of the physical area represented by the occupancy map 608. In an embodiment, the sub-maps 704 are disjoint, or have no overlapping regions. In an embodiment, the sub-maps 704 have overlapping regions. In an embodiment, the sub-maps 704 are of a same size (e.g., the same dimensions). In an embodiment, the sub-maps have varied sizes.

The prediction system 706 takes as inputs the sub-maps 704 and generates predicted regions 708, also known as sub-map segmentation masks. Predicted regions 708 contain labels indicating whether a drivable road segment is in the sub-maps 704. In an embodiment, the prediction system 706 is a machine learning algorithm. In such an embodiment, the prediction system 706 is an artificial neural network. The discussion that follows assumes the prediction system 706 is an artificial neural network. However, the prediction system 706 can be any suitable machine learning model.

In an embodiment, the prediction system 706 is a convolutional neural network containing at least one convolutional layer. For example, the prediction system 706 is based on the U-Net, which is usually used in biomedical image segmentation but can be used in general segmentation tasks. A convolutional layer is a layer in a neural network that performs convolution on the input to the layer. Convolution is an operation where a convolutional kernel (e.g. a 5×5 matrix) is convolved with the input tensor to produce a new tensor. In an embodiment, the prediction system 706 is a fully convolutional neural network, in which convolutional layers replace fully connected layers.

In an embodiment, the prediction system 706 is a recurrent neural network containing at least one recurrent layer. A recurrent layer is a neural network layer that has internal memory. The memory is updated whenever there is a new input. The output of the recurrent layer is computed using both the current input and the internal memory.

In an embodiment, the predicted region 708 is a binary segmentation mask (e.g. a 2D binary map) of the same size of its corresponding sub-map 704. For each sub-map, the prediction system 706 determines for each pixel of the sub-map either a label of 1 (e.g., being part of a drivable road segment) or a label of 0 (e.g., not being part of a drivable road segment). The labels form the corresponding predicted regions 708.

Dividing the input occupancy map 608 into smaller sub-maps 704 often reduces the computation time and the amount of computational resources required for the example inference system 610. As the prediction system 706 contains a number of parameters proportional (often exponential) to the size of the input, evaluating multiple small-sized sub-maps 704 is often faster than evaluating a large-sized input occupancy map 608, because the number of parameters used to evaluate several small-sized sub-maps 704 is significantly lower than the number of parameters used to evaluate a large-sized input occupancy map 608.

During training of the prediction system 706, in an embodiment, the prediction system 706 inputs to the prediction system 706 is mostly positive samples as training samples. A positive sample refers to sample sub-maps with segments positively identified as a drivable area. By contrast, a negative sample refers to sample sub-maps with little to no drivable road segments. Traditionally, to train a neural network such as the prediction system 706, the required training samples is a balanced set containing roughly equal amount of positive samples and negative samples. The purposeful use of mostly positive samples as training samples nearly halves the number of training samples necessary to train the prediction system 706. Fewer training samples also reduces the time required to train the prediction system 706. In addition, use of mostly positive samples as training samples enhances the ability of the prediction system 706 to label drivable road segments. In embodiments, the false positives are rectified by the filtering system 614 shown in FIG. 6.

During training of the prediction system 706, in an embodiment, the loss function used to train the prediction system 706 is a binary cross-entropy loss, also known as sigmoid cross-entropy loss. In an embodiment, the loss function used to train the prediction system 706 is a combination of binary cross-entropy loss and other loss functions.

During training of the prediction system 706, in an embodiment, weights in the prediction system 706 are updated via backpropagation such that the output labels in the predicted regions 708 generated by the prediction system 706 converge to labels in the ground truth data. In an embodiment, the ground truth data is a 2D binary map consisting of hand-labeled labels by experts. More details regarding updating the weights of the prediction system 706 are found below in reference to FIG. 8.

During operation of the prediction system 706, the prediction system 706 takes as inputs one or more sub-maps 704 and generates a predicted region 708 for each sub-map 704 in parallel or in series. In such an embodiment, a sliding window (e.g., a square- or rectangle-shaped box) which contains parts of two of more adjacent sub-maps 704 is constructed. The output labels (e.g., in two or more corresponding predicted regions 708) from the region bounded by the sliding window are evaluated against a corresponding patch in the ground truth data. Output labels from the region (or a portion thereof) bounded by the sliding window to converge to the ground truth data (or a corresponding portion thereof) to generate a predicted region 708. In an embodiment, weights in the prediction system 706 are updated via backpropagation such that the output labels from the prediction system 706 converge to labels in the ground truth data. More details regarding updating the weights of the prediction system 706 are found below in reference to FIG. 8.

The sliding window ensures resulting prediction is uniform. In other words, the sliding window ensures that inside a drivable road segment, there is no big hole of a non-drivable segment. If there is a drivable road segment in the sliding window, the corresponding output will be assigned continuous labels. In other words, the predicted road segment is continuous in the corresponding predicted regions 708.

In embodiments, the prediction system 706 includes a recurrent neural network that learns the spatial relationships between adjacent or associated sub-maps 704 and makes continuous predictions about the drivable road segments without the use of a sliding window. The sliding window is not necessary to enforce the continuous labeling of drivable road segments in a recurrent neural network.

However, a convolutional neural network is much faster to train and to evaluate than a recurrent neural network. The sliding window ensures continuous labeling of drivable road segments in a convolutional neural network based prediction system 706. Furthermore, the input sub-maps 704 to the convolutional neural network based prediction system 706 should be of the same size. While sub-maps 704 containing overlaps may allow a recurrent neural network to learn the spatial relationships between the sub-maps faster, the sliding window can enforce uniformity in the predicted regions 708 across disjoint sub-maps 704. In addition, since disjoint sub-maps 704 often have smaller sizes than sub-maps 704 containing overlaps, disjoint sub-maps 704 are preferred inputs to a convolutional neural network.

In the following discussion, we assume that the prediction system 706 is based on a convolutional neural network, the input sub-maps 704 are disjoint and a sliding window is used in when generating predicted regions 708 using the prediction system 706.

In an embodiment, the sliding window slides horizontally or vertically across the input occupancy map 608. The movement of the sliding window allows the prediction system 706 to label, across the input occupancy map 608, drivable road segments which are partitioned into disjoint portions by several disjoint sub-maps 704. More details regarding the sub-maps 704, the sliding window and the reasons that the sliding window ensures the resulting prediction is uniform are found below in reference to FIG. 8.

A combination system 710 takes as inputs the predicted regions 708 and generates the inferred segmentation mask 612. The combination system arranges the predicted regions 708 according to the locations of the corresponding sub-maps 704 in the input occupancy map 608. In an embodiment, the inferred segmentation mask 612 has the same size and dimension as the input occupancy map 608.

Figure 8:
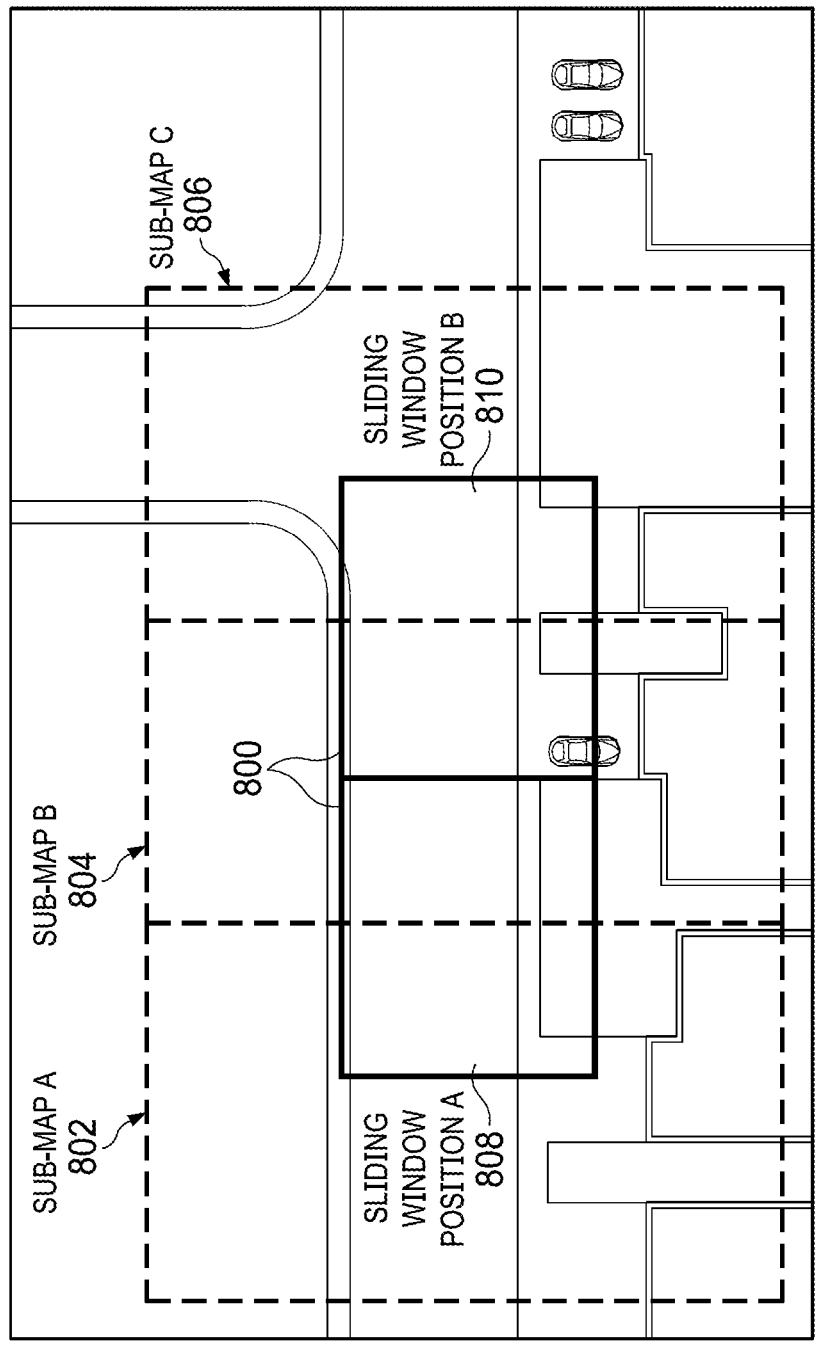
FIG. 8 shows an illustration of the relationship between an occupancy map, sub-maps and sliding windows.

FIG. 8 is an illustration of an occupancy map 608, sub-maps 704, and sliding windows 800 during training a convolutional neural network based prediction system 706. A portion of an example occupancy map 608 is shown in FIG. 8. In an embodiment, the occupancy map 608 is divided into several equal-sized and disjoint sub-maps 704. Some example sub-maps 704 are shown bounded by the dashed lines, such as sub-map A 802, sub-map B 804 and sub-map C 806. In an embodiment, the sliding window 800 bounded by the solid line moves to multiple locations, including sliding window position A 808 and sliding window position B 810, across the sub-maps A 802, B 804 and C 806. Sliding window position A 808 contains a disjoint part of sub-map A 802 and sub-map B 804 while sliding window position B 810 contains a disjoint part of sub-map B 804 and sub-map C 806. In an embodiment, sliding window position A 808 and sliding window position B 810 are disjoint, or are not overlapping.

In an embodiment, sub-map A 802, sub-map B 804 and sub-map C 806 are inputs to the prediction system 706. Each of the sub-map A 802, B 804 or C 806 has a corresponding output prediction region 708 (not shown in the illustration) generated by the prediction system 706. For a given sub-map A 802, B 804 or C 806, only the corresponding portion of the output prediction region 708 covered by the sliding window 800 is considered during the backpropagation when predicting if a current area is a drivable area or not a drivable area. For example, for the predicted region 708 of sub-map A 802, only the intersection between sub-map A 802 and sliding window position A 808 is considered. The output labels in the intersection (which is near the border of a predicted region 708) is evaluated against the labels in the ground truth. A gradient of the difference between the output labels and the ground truth is propagated, according to the loss function used, to update the weights in the prediction system 706 via backpropagation. In the backpropagation, only the weights associated with the intersection in the prediction system 706 are updated, while other weights are left unchanged. The selected weight updating during backpropagation enables labels in the disjoint predicted regions 708 generated by the prediction system 706 to converge faster as fewer weight updates are needed and more updates happen to weights associated with the border of predicted regions 708.

Output labels from the predicted region 708 of a neighboring sub-map (e.g., sub-map 804) converge to the ground truth in a similar process. The output labels from the sub-map 802 and sub-map 804 indicate a continuous drivable road segment as indicated by the ground truth data. Although the partitioned road segments are in disjoint sub-maps, the sliding window allows the prediction system 706 to generate continuous labels for continuous drivable road segments, especially around the border of predicted regions 708.

In an embodiment, the backpropagation is performed over multiple iterations such that the output labels converge to the ground truth labels. After backpropagation, the union of the output prediction regions 708 corresponding to sub-maps A 802, B 804 or C 806 indicate a continuous drivable road segment. Predictions with the sliding window 800 allows uniform and continuous labels across the disjoint output prediction regions 708.

The sliding window 800 moves to new locations horizontally or vertically following or against the directions indicated by the double headed arrows. This ensures the sliding window 800 covers an entire input occupancy map 608. This allows the predicted regions 708, also called sub-map segmentation masks, even disjoint, contain continuous labels. The resulting output inferred segmentation mask 612 formed by combining the sub-map segmentation masks regions 708 contain continuous labels for drivable road segments.

Figure 9:
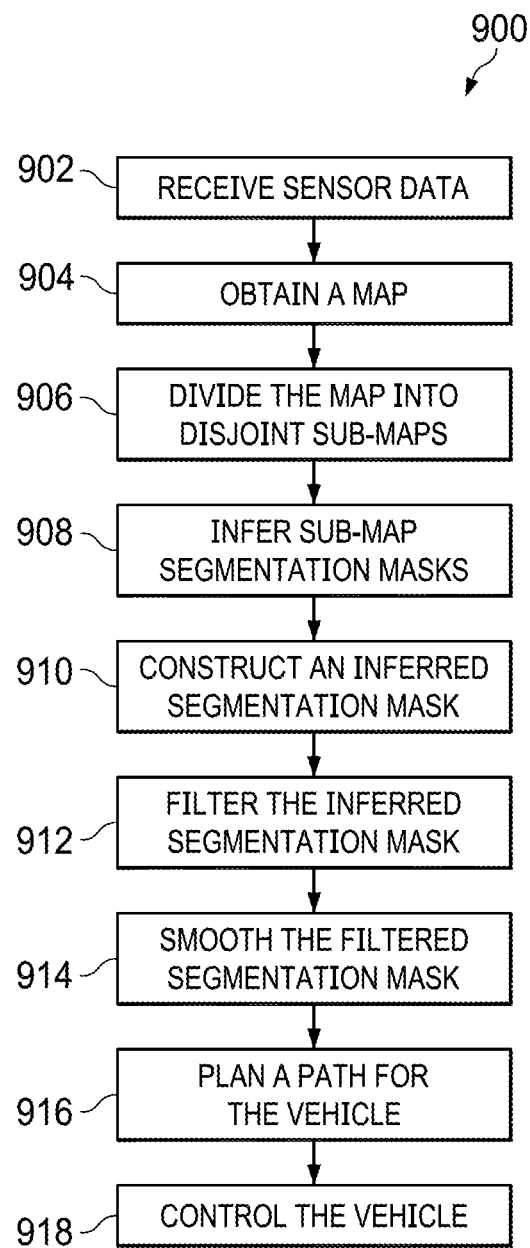
FIG. 9 shows a flowchart of an example process of automatically annotating drivable road segments.

FIG. 9 shows a flowchart of a process 900 for automatically annotating drivable road segments for a vehicle. In an embodiment, the vehicle is the AV 100 shown in FIG. 1. In an embodiment, the process 900 is carried out by at least one processor such as the processor 304 shown in FIG. 3. In an embodiment, the process 900 is carried out by at least one of the perception module 402, the planning module 404, the control module 406 or the localization module 408 shown in FIG. 4. In an embodiment, the process 900 is carried out by at least one remote processor in the cloud 202 shown in FIG. 2.

At block 902, the processor receives sensor data indicative of an environment surrounding a vehicle. In an embodiment, the sensor data are the sensor data 604 obtained from the sensors 602 as shown in FIG. 6.

At block 904, the processor obtains a map representative of the surrounding environment. In an embodiment, the map is the occupancy map 608 as shown in FIG. 6.

At block 906, the processor divides the occupancy map into sub-maps (e.g., disjoint sub-maps). In an embodiment, the sub-maps are the sub-maps 704 as shown in FIG. 7.

At block 908, for each sub-map, the processor infers, with a machine learning model, a sub-map segmentation mask indicative of a drivable road segment on the sub-map. In an embodiment, the sub-map segmentation mask is the predicted region 708 generated from the prediction system 706 as shown in FIG. 7.

At block 910, the processor constructs an inferred segmentation mask indicative of all drivable road segments on the map, based on the sub-map segmentation masks indicative of determined drivable road segments on each sub-map. In an embodiment, the inferred segmentation mask is the inferred segmentation mask 612 as shown in FIGS. 6 and 7.

At block 912, the processor filters the inferred segmentation mask of determined drivable road segments based on a threshold. In an embodiment, the inferred segmentation mask is the inferred segmentation mask 612 as shown in FIG. 6. In an embodiment, the filtered segmentation mask is the filtered segmentation mask 616 as shown in FIG. 6. In an embodiment, the threshold is a value described in accordance with FIG. 6.

At block 914, the processor smooths the filtered segmentation mask of drivable road segments to generate a continuous output drivable road segment based on at least one criterion. In an embodiment, the filtered segmentation mask is the filtered segmentation mask 616 as shown in FIG. 6. The smoothed segmentation mask is the output segmentation mask 620 as shown in FIG. 6. In an embodiment, the at least one criterion is the criterion described in accordance with FIG. 6.

At block 916, the processor plans a path for the vehicle to navigate based on the output segmentation mask of drivable road segments. In an embodiment, the processor plans through a planner 622 as shown in FIG. 6, which is at least part of a planning circuit 404 as shown in FIG. 4. In an embodiment, the output segmentation mask is the output segmentation mask 620 as shown in FIG. 6.

At block 918, the processor controls the vehicle based on the planned path. In an embodiment, the processor includes at least part of a control circuit 406 as shown in FIG. 4.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   generating a map representative of an environment based on sensor data wherein the map comprises at least one map layer;
   dividing the at least one map layer into sub-maps, wherein at least two adjacent sub-maps are input to a prediction system that outputs labels associated with road segments of at least one sub-map;
   combining the sub-maps and labels associated with road segments to generate an inferred segmentation mask corresponding to the map, wherein the at inferred segmentation mask identifies pixels of the map as corresponding to a drivable road segment;
   filtering the inferred segmentation mask to generate a filtered segmentation mask, wherein the filtering is based on a likelihood that the drivable road segment corresponds to an area occupied by an object;
   smoothing the filtered segmentation mask to generate a smoothed, filtered inferred segmentation mask with at least one continuous drivable road segment, based on at least one criterion; and
   navigating a path planned using the smoothed, filtered inferred segmentation mask.

2. The method of claim 1, wherein a machine learning model is trained to generate the inferred segmentation mask with positive samples, wherein positive samples contain part of a sampled drivable road segment.

3. The method of claim 1, further comprising identifying the pixels of the sub-map as corresponding to the drivable road segment by:
   applying a sliding window across the sub-maps; and
   updating via backpropagation, weights of a convolutional neural network based on output labels bounded by the sliding window and ground truth data.

4. The method of claim 3, wherein the convolutional neural network has a loss function comprising at least in part a binary cross-entropy loss.

5. The method of claim 1, wherein the likelihood that the drivable road segment corresponds to the area occupied by the object is obtained from an occupancy map.

6. The method of claim 1, wherein the at least one criterion comprises at least the area enclosed by a contour of the drivable road segment.

7. A vehicle, comprising:
   at least one processor; and
   at least one memory storing instructions thereon that, when executed by the at least one processor, cause the at least one processor to:
   generate a map representative of an environment based on sensor data wherein the map comprises at least one map layer;
   divide the at least one map later into sub-maps, wherein at least two adjacent sub-maps are input to a prediction system that outputs labels associated with road segments of at least one sub-map;
   combining the sub-maps and labels associated with road segments to generate an inferred segmentation mask corresponding to the map, wherein the inferred segmentation mask identifies pixels of the map as corresponding to a drivable road segment;
   filter the inferred segmentation mask to generate a filtered segmentation mask, wherein the filtering is based on a likelihood that the drivable road segment corresponds to an area occupied by an object;
   smooth the filtered segmentation mask to generate a smoothed, filtered inferred segmentation mask with at least one continuous drivable road segment, based on at least one criterion; and
   navigate a path planned using the smoothed, filtered inferred segmentation mask.

8. The vehicle of claim 7, wherein a machine learning model is trained to generate the inferred segmentation mask with positive samples, wherein positive samples contain part of a sampled drivable road segment.

9. The vehicle of claim 7, wherein the instructions further comprise:
   applying a sliding window across the sub-maps; and
   updating weights of a convolutional neural network based on output labels bounded by the sliding window and ground truth data via backpropagation.

10. The vehicle of claim 9, wherein the convolutional neural network has a loss function comprising at least in part a binary cross-entropy loss.

11. The vehicle of claim 7, wherein the likelihood that the drivable road segment corresponds to the area occupied by the object is obtained from an occupancy map.

12. The vehicle of claim 7, wherein the at least one criterion comprises at least the area enclosed by a contour of the drivable road segment.

13. A non-transitory computer-readable storage medium comprising at least one program for execution by at least one processor of a first device, the at least one program including instructions which, when executed by the at least one processor, cause the first device to:

generate a map representative of an environment based on sensor data, wherein the map comprises at least one map layer;

divide the at least one map layer into sub-maps, wherein at least two adjacent sub-maps are input to a prediction system that outputs labels associated with road segments of at least one sub-map;

combining the sub-maps and labels associated with road segments to generate an inferred segmentation mask corresponding to the map, wherein the inferred segmentation mask identifies pixels of the map as corresponding to a drivable road segment;

filter the inferred segmentation mask to generate a filtered segmentation mask, wherein the filtering is based on a likelihood that the drivable road segment corresponds to an area occupied by an object;

smooth the filtered segmentation mask to generate a smoothed, filtered inferred segmentation mask with at least one continuous drivable road segment, based on at least one criterion; and navigate a path planned using the smoothed, filtered inferred segmentation mask.

14. The computer-readable storage medium of claim 13, wherein a machine learning model is trained to generate the inferred segmentation mask with positive samples, wherein positive samples contain part of a sampled drivable road segment.

15. The computer-readable storage medium of claim 13, further comprising identifying pixels of the sub-map as corresponding to the drivable road segment by:

applying a sliding window across the sub-maps; and updating via backpropagation, weights of a convolutional neural network based on output labels bounded by the sliding window and ground truth data.

16. The computer-readable storage medium of claim 15, wherein the convolutional neural network has a loss function comprising at least in part a binary cross-entropy loss.

17. The computer-readable storage medium of claim 13, wherein the likelihood that the drivable road segment corresponds to the area occupied by the object is obtained from an occupancy map.

* * * * *